United States Patent
Narendra et al.

(10) Patent No.: US 9,483,723 B2
(45) Date of Patent: *Nov. 1, 2016

(54) PASSIVE CONTROL SECURE TRANSACTION CARD

(71) Applicant: Tyfone, Inc., Portland, OR (US)

(72) Inventors: Siva G. Narendra, Portland, OR (US); Donald Allen Bloodworth, Camas, WA (US); Prabhakar Tadepalli, Bangalore (IN)

(73) Assignee: Tyfone, Inc., Portland, OR (US)

(*) Notice: Subject to any disclaimer, the term of this patent is extended or adjusted under 35 U.S.C. 154(b) by 179 days.

This patent is subject to a terminal disclaimer.

(21) Appl. No.: 14/047,005

(22) Filed: Oct. 6, 2013

(65) Prior Publication Data

US 2015/0097037 A1  Apr. 9, 2015

(51) Int. Cl.
*G06K 19/06* (2006.01)
*G06K 19/073* (2006.01)
*G06K 19/077* (2006.01)

(52) U.S. Cl.
CPC ... *G06K 19/07345* (2013.01); *G06K 19/07701* (2013.01); *G06K 19/07749* (2013.01)

(58) Field of Classification Search
CPC ............... G06K 19/07345; G06K 19/07701; G06K 19/07749; G06K 19/0723
USPC ........................................ 235/487, 488, 492
See application file for complete search history.

(56) References Cited

U.S. PATENT DOCUMENTS

| | | | |
|---|---|---|---|
| 6,588,660 B1 | 7/2003 | Buescher et al. | |
| 6,752,321 B1 | 6/2004 | Leaming | |
| 6,863,220 B2 * | 3/2005 | Selker | 235/492 |
| 7,100,835 B2 | 9/2006 | Selker | |
| 7,472,834 B2 | 1/2009 | Rizzo | |
| 8,181,879 B2 * | 5/2012 | Landau et al. | 235/487 |
| 8,899,487 B2 | 12/2014 | Saito et al. | |
| 8,918,900 B2 | 12/2014 | Saito | |
| 2003/0132301 A1 * | 7/2003 | Selker | 235/487 |
| 2004/0124248 A1 * | 7/2004 | Selker | 235/492 |
| 2005/0240778 A1 | 10/2005 | Saito | |
| 2006/0289657 A1 * | 12/2006 | Rosenberg | 235/492 |
| 2008/0035740 A1 * | 2/2008 | Tanner | 235/492 |
| 2008/0061148 A1 * | 3/2008 | Tanner | 235/492 |
| 2008/0105751 A1 * | 5/2008 | Landau | 235/492 |
| 2008/0156885 A1 * | 7/2008 | Landau et al. | 235/492 |
| 2008/0217413 A1 * | 9/2008 | Tanner | 235/492 |
| 2008/0223925 A1 | 9/2008 | Saito et al. | |
| 2009/0230197 A1 * | 9/2009 | Tanner | 235/492 |
| 2010/0039234 A1 | 2/2010 | Soliven et al. | |
| 2012/0241524 A1 * | 9/2012 | Blot et al. | 235/492 |
| 2013/0207786 A1 | 8/2013 | Hutzler et al. | |
| 2014/0263624 A1 | 9/2014 | Guillaud | |

OTHER PUBLICATIONS

U.S. Appl. No. 14/047,006 Office Action dated Oct. 9, 2015, 12 pages.

(Continued)

*Primary Examiner* — Paultep Savusdiphol

(74) *Attorney, Agent, or Firm* — Dana B. LeMoine

(57) ABSTRACT

A secure transaction card does not interact with an interrogating radio frequency field without user interaction. The user interaction may include pressing on the card to cause a smartcard chip to connect to a coil on the card. The user interaction may also include exposing the card to light, motion, touch, or the like. Control of the secure transaction card may be active or passive.

19 Claims, 18 Drawing Sheets

(56) References Cited

OTHER PUBLICATIONS

U.S. Appl. No. 14/047,007 Office Action dated Aug. 17, 2015, 9 pages.

U.S. Appl. No. 14/047,006 Office Action dated Jan. 15, 2015, 11 pages.

U.S. Appl. No. 14/047,007 Office Action dated Mar. 5, 2015, 9 pages.

\* cited by examiner

FIG. 2
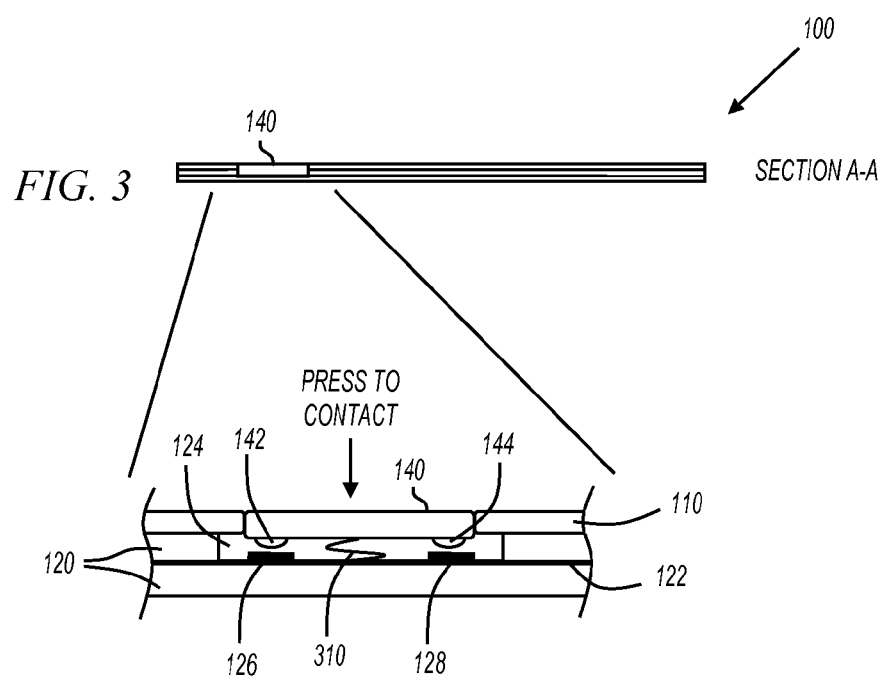
FIG. 3
FIG. 4

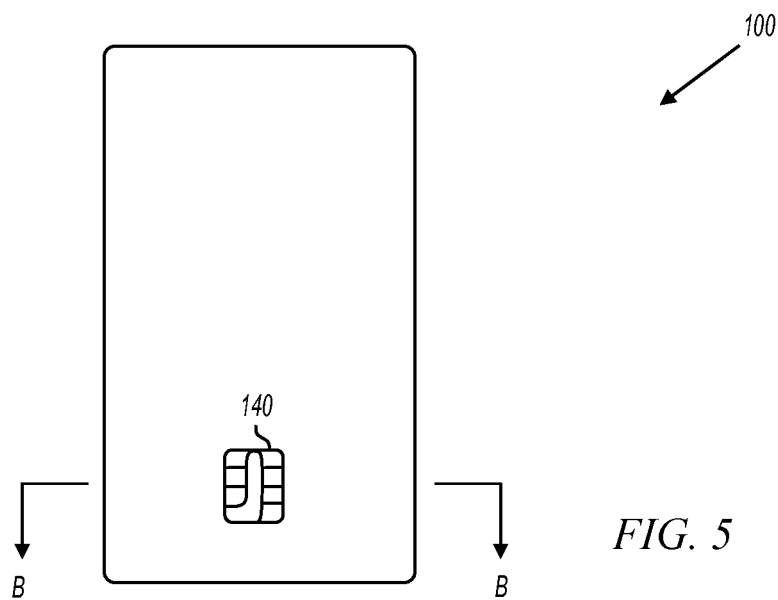
FIG. 5
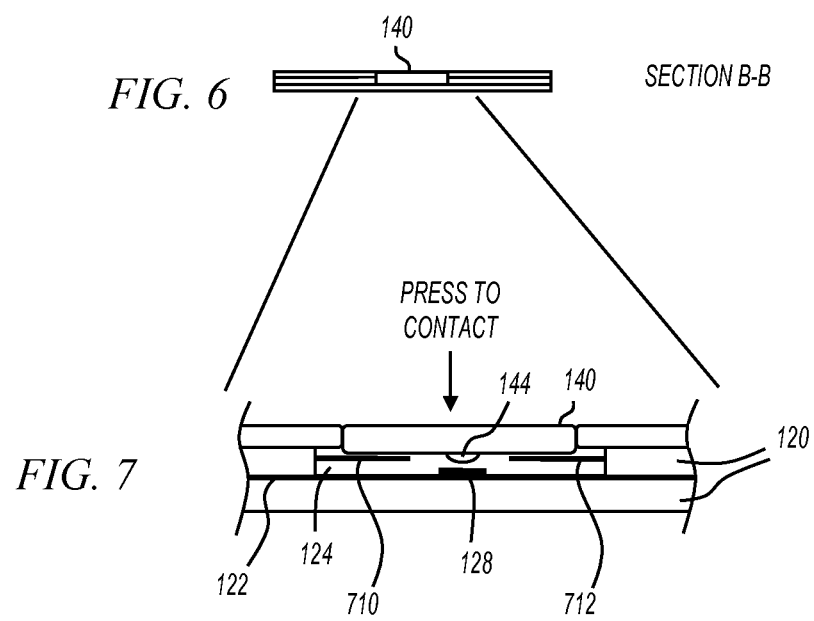
FIG. 6
FIG. 7

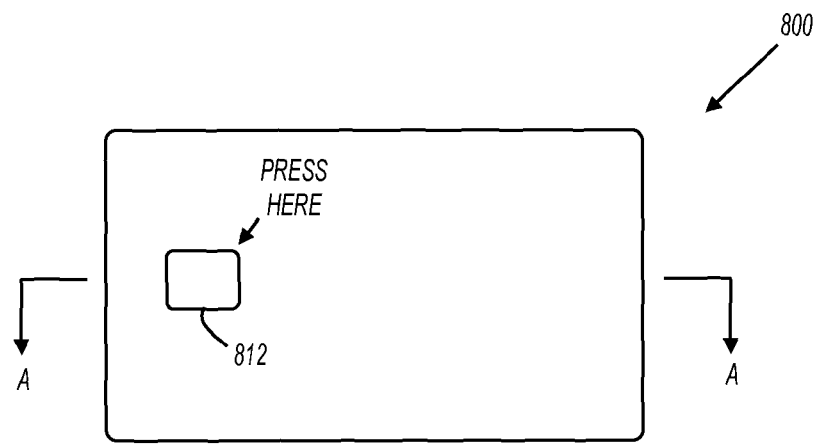
FIG. 9
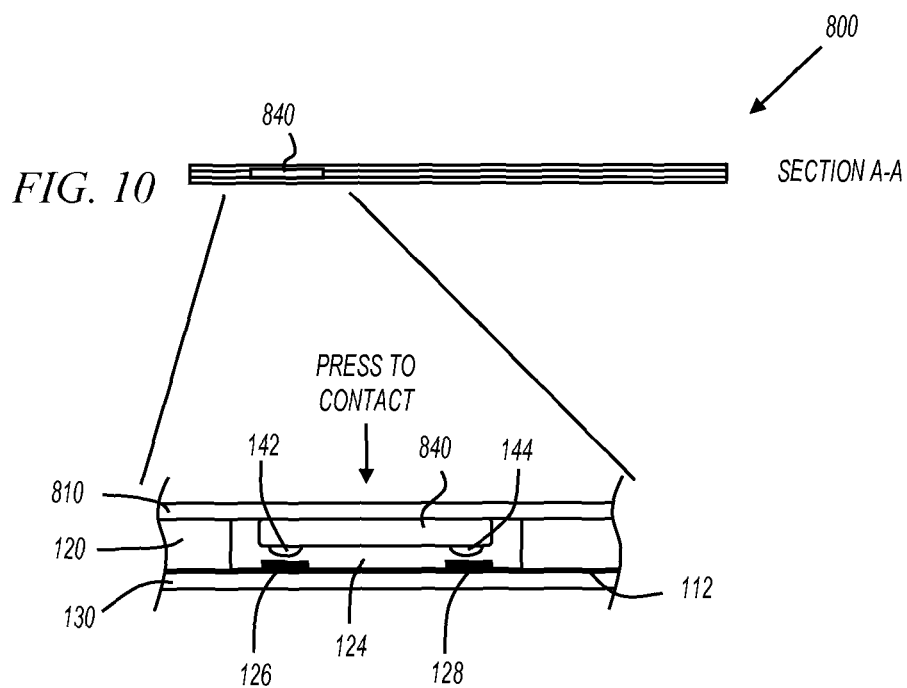
FIG. 10
FIG. 11

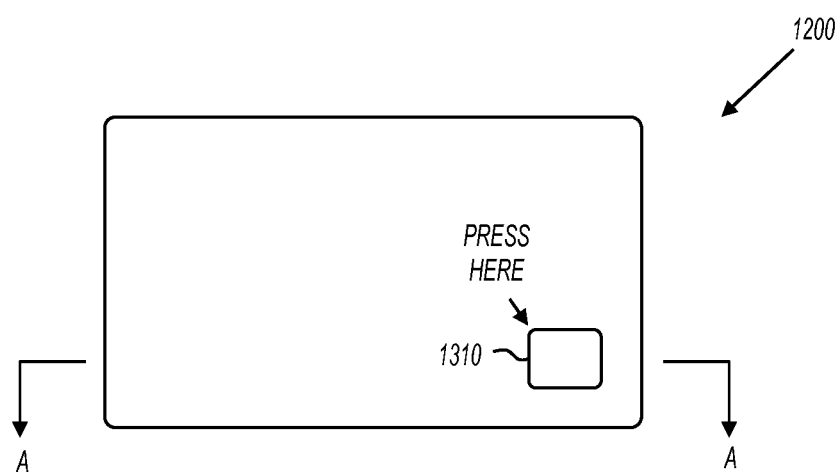
FIG. 13
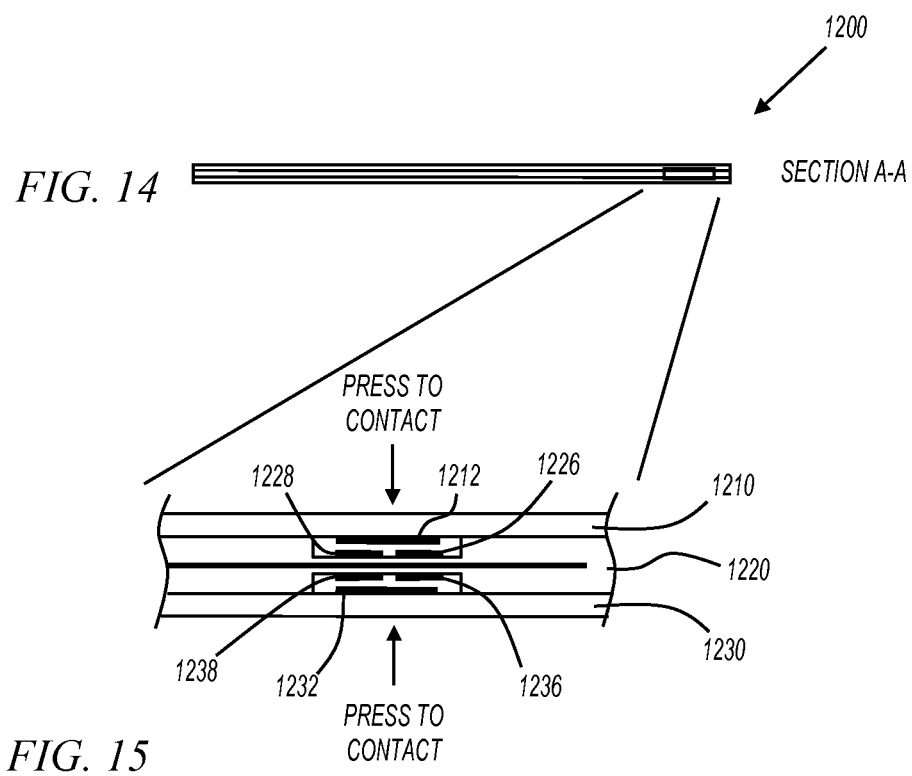
FIG. 14
FIG. 15

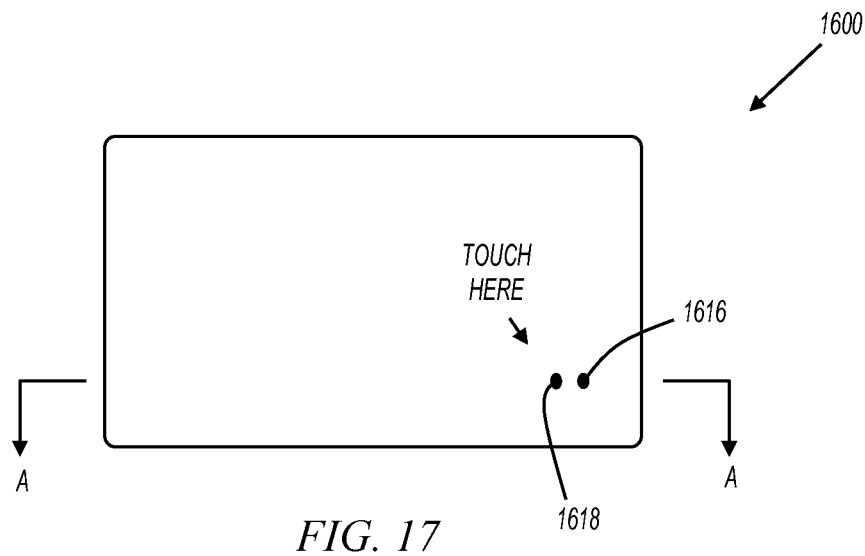
FIG. 17
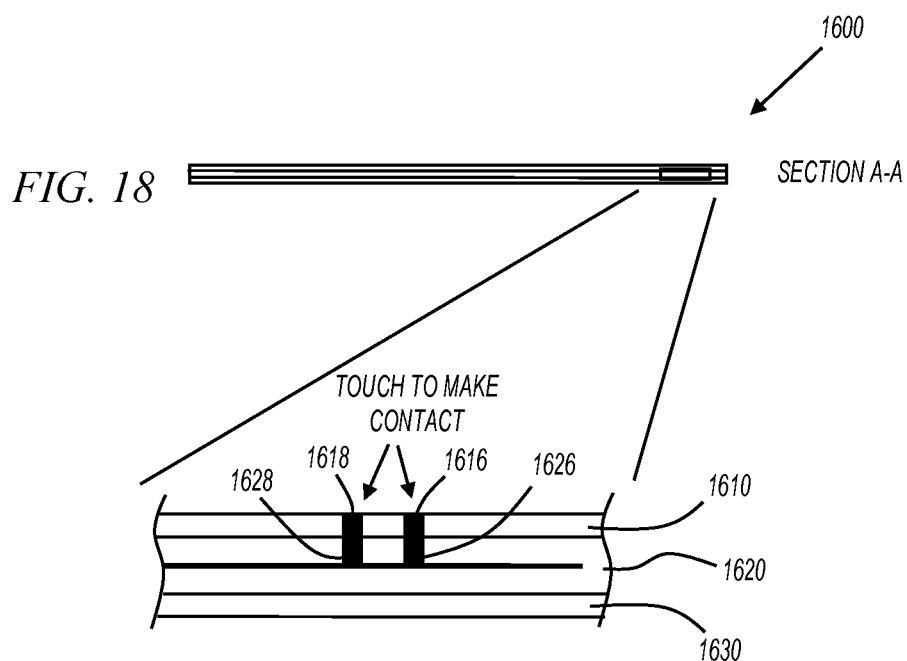
FIG. 18
FIG. 19

PASSIVE CONTROL SECURE TRANSACTION CARD

FIELD

The present invention relates generally to transaction cards, and more specifically to transaction cards with smartcard chips.

BACKGROUND

A transaction card may include a smartcard chip and a coil. The smartcard chip is typically connected to the coil so that when the transaction card is in the presence of an interrogating radio frequency field, the transaction card receives power and transfers information to the device emitting the interrogating radio frequency field.

BRIEF DESCRIPTION OF THE DRAWINGS

FIG. 2 shows a top view of the secure transaction card of FIG. 1;

FIG. 3 shows a sectional view of the secure transaction card of FIG. 1;

FIG. 4 shows a detail view of a portion of the transaction card shown in FIG. 1;

FIG. 5 shows a top view of the secure transaction card of FIG. 1;

FIG. 6 shows a second sectional view of the secure transaction card of FIG. 1;

FIG. 7 shows a second detail view of a portion of the transaction card shown in FIG. 1;

FIG. 9 shows a top view of the secure transaction card of FIG. 8;

FIG. 10 shows a sectional view of the secure transaction card of FIG. 8;

FIG. 11 shows a detail view of a portion of the transaction card shown in FIG. 8;

FIG. 13 shows a top view of the secure transaction card of FIG. 12;

FIG. 14 shows a sectional view of the secure transaction card of FIG. 12;

FIG. 15 shows a detail view of a portion of the transaction card shown in FIG. 12;

FIG. 17 shows a top view of the secure transaction card of FIG. 16;

FIG. 18 shows a sectional view of the secure transaction card of FIG. 16;

FIG. 19 shows a detail view of a portion of the transaction card shown in FIG. 16;

DESCRIPTION OF EMBODIMENTS

Figure 1:
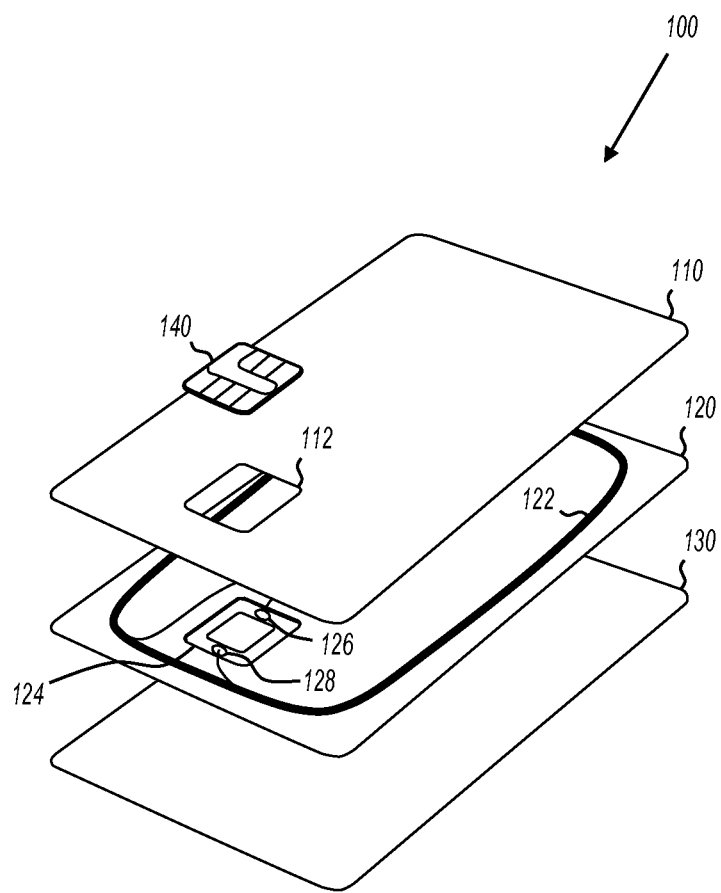
FIG. 1 shows an exploded view of a secure transaction card.

In the following detailed description, reference is made to the accompanying drawings that show, by way of illustration, various embodiments of an invention. These embodiments are described in sufficient detail to enable those skilled in the art to practice the invention. It is to be understood that the various embodiments of the invention, although different, are not necessarily mutually exclusive. For example, a particular feature, structure, or characteristic described in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows an exploded view of a secure transaction card. Secure transaction card 100 includes multiple layers 110, 120, 130 that are laminated together, and also includes smartcard chip 140. Three layers are shown in FIG. 1; however, any number of layers may be included without departing from the scope of the present invention. Further, the layers may be of any thickness and any relative thickness. For example, some layers may be thicker than others.

Examples of smartcard chips are the "SmartMX" controllers sold by NXP Semiconductors N.V. of Eindhoven, The Netherlands. In some embodiments, smartcard chip 140 has an ISO/IEC 7816 compatible interface that communicates using a "contact" interface, although this is not a limitation of the present invention. Further, in some embodiments, smartcard chip 140 includes a near field communications (NFC) radio (not shown) that includes an ISO/IEC 14443 "contactless" interface. Smartcard chips that include both a "contact" interface and a "contactless" interface are referred to herein as "dual-interface" smartcard chips.

In some embodiments, smartcard chip 140 is a dual-interface smartcard chip, and secure transaction card 100 may operate as either a contact card, or a contactless card. When secure transaction card 100 is operating as a contact card, electrical contacts on top of smartcard chip 140 provide electrical connectivity after secure transaction card 100 is inserted in a reader. When secure transaction card 100 is operating as a contactless card, smartcard chip 140 is powered using energy inductively coupled to secure transaction card 100 when the card is placed in the presence of an interrogating radio frequency field.

A first layer of secure transaction card 100 is shown at 120. Layer 120 includes an electrically conductive coil 122, a recessed portion 124, and coil contacts 126, 128. Coil 122 may have any number of turns. The ends of coil 122 are electrically connected to coil contacts 126, 128. Coil contacts 126, 128 are typically metal contacts that may make contact with antenna contacts on the underside of smartcard chip 140 (not shown in FIG. 1). In some embodiments, coil 122 is on the top surface of layer 120 as shown. In other embodiments, coil 122 is embedded within layer 120. For example, layer 120 may have sublayers, and coil 122 may be embedded within or between sublayers. In still further embodiments, coil 122 is on a bottom surface of layer 120.

Layer 110 is above layer 120. The term "above" is a relative term. For example, layer 110 may be considered to be below layer 120 when secure transaction card 100 is turned over. Accordingly, the terms "above," "below," and the like are meant to describe relative orientations, and are not meant to describe an absolute orientation. Layer 110 includes hole 112. Hole 112 is sized to receive smartcard chip 140 and to allow the electrical contacts on top of smartcard chip 140 to be exposed on the surface of secure transaction card 100. Layer 130 is below 120.

Layers may be made of plastic, polymers, or any other material. For example, in some embodiments, various layers of transaction card 100 are made of polyvinyl chloride, polyethylene terephthalate based polymers, acrylonitrile butadiene styrene or polycarbonate. In other embodiments, various layers of transaction card 100 are made of organic materials commonly used to manufacture printed circuit boards. Secure transaction cards described herein may be made of any type of material without departing from the scope of the present invention.

Smartcard chip 140 is shown as a single monolithic element in FIG. 1; however, in some embodiments, smartcard chip 140 includes an integrated circuit die, a substrate, bonding wires, encapsulating material, and more. The packaging of smartcard chip 140 is not a limitation of the present invention.

In operation, smartcard chip 140 is not always in electrical contact with coil 122. For example, in some embodiments, smartcard chip 140 is suspended above coil contacts 126, 128 such that unless secure transaction card 100 is pressed in the vicinity of smartcard chip 140, or smartcard chip 140 is pressed directly, no connection to the coil is made. This keeps secure transaction card 100 from responding to a reader unless a user presses on the card. Various embodiments requiring user intervention are further described below.

FIG. 2 shows a top view of the secure transaction card of FIG. 1. Smartcard chip 140 is shown with electrical contacts exposed on a surface of the card. Some embodiments are only contactless and do not have exposed contacts. Examples of contactless-only embodiments are described further below.

Secure transaction card 100 may have any dimensions, and those dimensions may or may not comply with a standard such as ISO/IEC 7810. For example, in some embodiments, the dimensions of secure transaction card are 3.370 in×2.125 in×0.030 thick, although this is not a limitation of the present invention.

FIG. 3 shows a sectional view of the secure transaction card of FIG. 1. The sectional view in FIG. 3 shows smartcard chip 140 and at least some of the layers making up the card. In some embodiments, secure transaction card 100 may include many more than three layers. For example, secure transaction card 100 may include additional plastic layers, printed layers with branding information, and outermost protective layers.

FIG. 4 shows a detail view of a portion of the transaction card shown in FIG. 1. A cross section of smartcard chip 140 is shown in FIG. 4, as are coil 122, coil contacts 126, 128, antenna contacts 142, 144, and spring 310. In embodiments represented by FIG. 4, coil 122 is embedded within layer 120, and layer 130 is not shown. As shown in FIG. 4, spring 310 is a standoff mechanism to keep antenna contacts 142, 144 on smartcard chip 140 from contacting the two coil contacts 126, 128 unless smartcard chip 140 is pressed towards the first layer 120.

Spring 310 is shown as a coil spring contacting smartcard chip 140 near the center, but the various embodiments of the invention are not so limited. For example, in some embodiments, the standoff mechanism supports smartcard chip 140 around the periphery, on the sides, or on the corners. Also for example, in some embodiments, a spring type other than a coil spring is used for the standoff mechanism.

In operation, coil 122 is not connected to smartcard chip 140 unless smartcard chip 140 is pressed. Accordingly, even when in the presence of an interrogating radio frequency field, smartcard chip 140 will not communicate with a reader without user intervention. This increases the security of secure transaction card 100, in part because the smartcard chip cannot be interrogated without the user's consent.

FIG. 5 shows a top view of the secure transaction card of FIG. 1. The top view shown in FIG. 5 is the same as the top view shown in FIG. 2 with the exception that secure transaction card 100 has been rotated 90 degrees counterclockwise in FIG. 5.

FIG. 6 shows a second sectional view of the secure transaction card of FIG. 1. The section shown in FIG. 6 is defined in FIG. 5. The section is taken through smartcard chip 140 at an angle that does not slice through the antenna contacts on the underside of smartcard chip 140.

FIG. 7 shows a second detail view of a portion of the transaction card shown in FIG. 1. A cross section of smartcard chip 140 is shown in FIG. 7, as are coil 122, coil contact 128, antenna contact 144, and cantilever springs 710 and 712. In embodiments represented by FIG. 7, coil 122 is embedded within layer 120, and layer 130 is not shown. As shown in FIG. 7, cantilever springs 710 and 712 are a standoff mechanism to keep antenna contacts 142, 144 on smartcard chip 140 from contacting the two coil contacts 126, 128 unless smartcard chip 140 is pressed towards the first layer 120.

In some embodiments, cantilever springs 710 and 712 are supported by layer 120 and extend beneath smartcard chip 140. For example, in some embodiments, layer 120 is plastic, and cantilever springs 710, 712 are formed as part of layer 120. In other embodiments, layer 120 is formed of sublayers, and one or more of the sublayers is extended to form cantilever springs 710, 712.

When at rest, cantilever springs 710, 712 cause smartcard chip 140 to be suspended above coil contacts 126, 128. Accordingly, in operation, coil 122 is not connected to smartcard chip 140 unless smartcard chip 140 is pressed, and smartcard chip 140 will not communicate with a reader without user intervention, even when in the presence of an interrogating radio frequency field. This increases the security of secure transaction card 100, in part because the smartcard chip cannot be interrogated without the user's consent.

Figure 8:
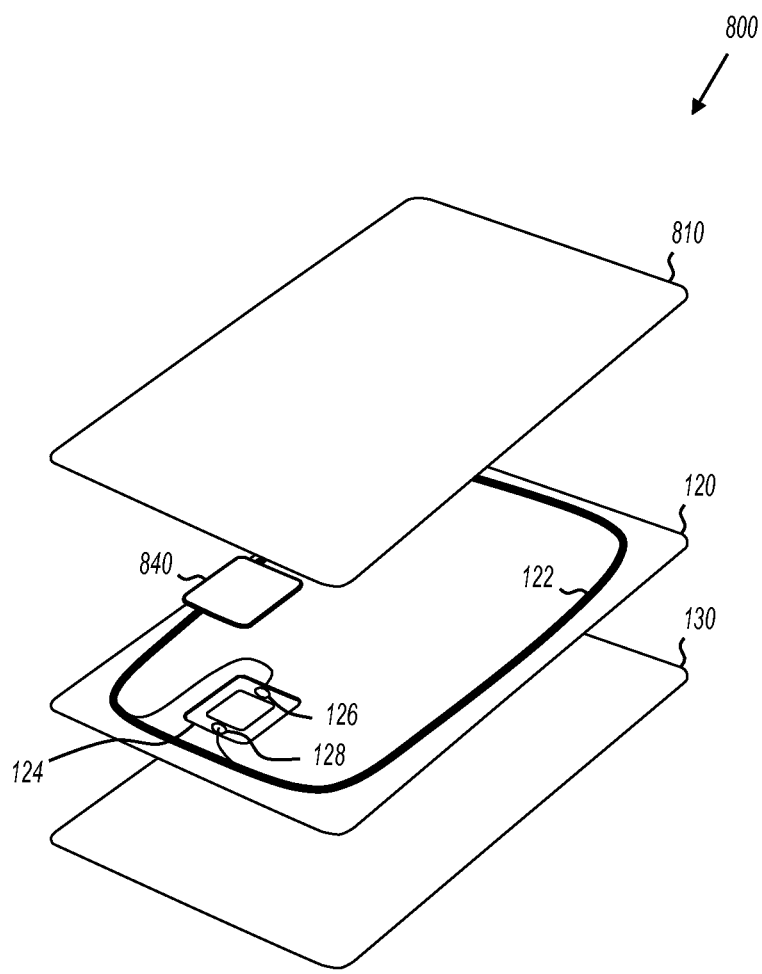
FIG. 8 shows an exploded view of a secure transaction card.

FIG. 8 shows an exploded view of a secure transaction card. Secure transaction card 800 includes multiple layers 810, 120, 130 that are laminated together, and also includes smartcard chip 840. Three layers are shown in FIG. 8; however, any number of layers may be included without departing from the scope of the present invention. Further, the layers may be of any thickness and any relative thickness. For example, some layers may be thicker than others.

In the example provided in FIG. 8, smartcard chip 840 does not include electrical contacts that will be exposed on a surface of the card. In some embodiments, smartcard chip 840 is a contactless-only chip and does not include an ISO/IEC 7816 interface. In other embodiments, smartcard chip 840 is a dual-interface smartcard chip that includes both ISO/IEC 7816 and ISO/IEC 14443 interfaces, and the ISO IEC 7816 interface is not exposed outside the transaction card.

First layer 120 of secure transaction card 800 is described above with reference to FIG. 1. Layer 120 includes an electrically conductive coil 122, a recessed portion 124, and coil contacts 126, 128. Second layer 810 is above layer 120. The term "above" is a relative term. For example, layer 810 may be considered to be below layer 120 when secure transaction card 800 is turned over. Layer 810 differs from layer 110 (FIG. 1), in that layer 810 does not include a hole to expose smartcard chip 840 on a surface of the transaction card. Layer 130 is below 120.

Smartcard chip 840 is shown as a single monolithic element in FIG. 8; however, in some embodiments, smartcard chip 840 includes an integrated circuit die, a substrate, bonding wires, encapsulating material, and more. The packaging of smartcard chip 840 is not a limitation of the present invention.

In operation, smartcard chip 840 is not always in electrical contact with coil 122. For example, in some embodiments, smartcard chip 840 is suspended above coil contacts 126, 128 such that unless secure transaction card 800 is pressed in the vicinity of smartcard chip 840, no connection to the coil is made. This keeps secure transaction card 800 from responding to a reader unless a user presses on the card. Various embodiments requiring user intervention are further described below.

FIG. 9 shows a top view of the secure transaction card of FIG. 8. Area 812 on the surface of secure transaction card 800 marks the vicinity of smartcard chip 840. When a user presses on area 812, contact is made between smartcard chip 840 and coil 122, and when in the presence of an interrogating radio frequency field, smartcard chip 840 may receive power and respond to a reader. Area 812 may be marked or indicated on the surface of secure transaction card 800 in any manner. For example, in some embodiments, a recognizable icon is placed in area 812, to that a user knows to press in that location. In other embodiments, text is placed in or near area 812 to alert the user to press on area 812 to effect a transaction.

FIG. 10 shows a sectional view of the secure transaction card of FIG. 8. The sectional view of FIG. 10 is similar to the sectional view of FIG. 3.

FIG. 11 shows a detail view of a portion of the transaction card shown in FIG. 8. A cross section of smartcard chip 840 is shown in FIG. 11, as are layers 810, 120, 130, coil 122, coil contacts 126, 128, and antenna contacts 142, 144. In embodiments represented by FIG. 11, coil 122 and coil contacts 126, 128 are on the bottom of layer 120. As shown in FIG. 11, smartcard chip 840 is bonded to the bottom of layer 810, and is suspended above coil contacts 126 and 128. The bonding of smartcard chip 840 to layer 810 and the size of recessed portion 124 form a standoff mechanism that keeps antenna contacts 142, 144 on smartcard chip 840 from contacting the two coil contacts 126, 128 unless smartcard chip 840 is pressed towards the first layer 120.

In some embodiments, the standoff mechanism shown in FIG. 11 is combined with standoff mechanisms described with reference to previous figures. For example, coil springs, cantilever springs or other types of springs may be placed in recessed portion 124 to aid in suspending smartcard chip 840 above coil contacts 126, 128.

FIG. 11 shows smartcard chip 840 being wholly within recessed portion 124, although this is not a limitation of the present invention. For example, in some embodiments, layer 810 includes a recessed portion, and all or a portion of smartcard chip 840 is within the recessed portion of layer 810.

During manufacture of secure transaction card 800, the various layers may be formed separately and smartcard chip 840 is bonded to one or more layers prior to the layers being laminated together. Similarly, coil 122 and coil contacts 126, 128 may be formed on or in layer 120 prior to laminating the various layers together.

In operation, coil 122 is not connected to smartcard chip 840 unless secure transaction card 800 is pressed in the vicinity of smartcard chip 840. Accordingly, even when in the presence of an interrogating radio frequency field, smartcard chip 840 will not communicate with a reader without user intervention. This increases the security of secure transaction card 800, in part because the smartcard chip cannot be interrogated without the user's consent.

Figure 12:
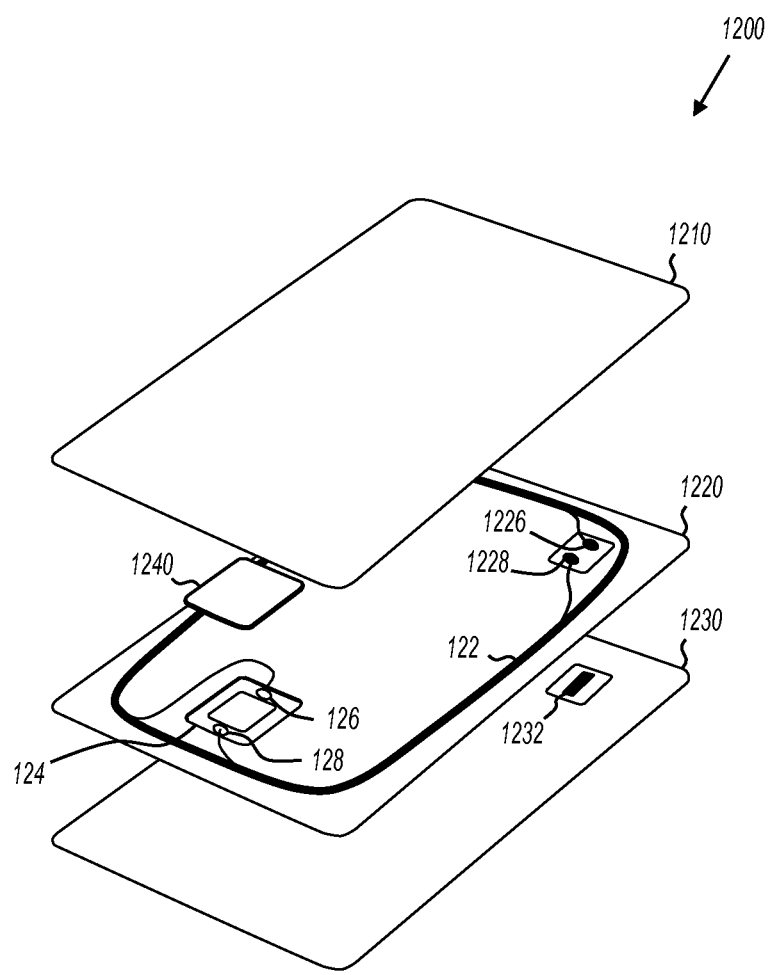
FIG. 12 shows an exploded view of a secure transaction card.

FIG. 12 shows an exploded view of a secure transaction card. Secure transaction card 1200 includes multiple layers 1210, 1220, 1230 that are laminated together, and also includes smartcard chip 1240. Three layers are shown in FIG. 12; however, any number of layers may be included without departing from the scope of the present invention. Further, the layers may be of any thickness and any relative thickness. For example, some layers may be thicker than others.

In the example provided in FIG. 12, smartcard chip 1240 does not include electrical contacts that will be exposed on a surface of the card. In some embodiments, smartcard chip 1240 is a contactless-only chip and does not include an ISO/IEC 7816 interface. In other embodiments, smartcard chip 1240 is a dual-interface smartcard chip that includes both ISO/IEC 7816 and ISO/IEC 14443 interfaces, and the ISO IEC 7816 interface is not exposed outside the transaction card.

First layer 1220 of secure transaction card 1200 is similar, but not identical, to layer 120 described above with reference to FIG. 1. Like layer 120 of FIG. 1, layer 1220 includes an electrically conductive coil 122, a recessed portion 124, and coil contacts 126, 128. Layer 1220 also includes electrical contacts 1226 and 1228 coupled to coil 122.

In some embodiments, smartcard chip 1240 is electrically bonded to layer 1220 such that the antenna contacts on the underside of smartcard chip 1240 are electrically bonded to coil contacts 126 and 128.

In some embodiments, electrical contacts 1226, 1228 are in series with coil 122, such that when an electrical connection is made between contacts 1226, 1228, smartcard chip 1240 is connected to coil 122 and is able to receive power and communicate when coil 122 is in the presence of an interrogating radio frequency field. Similarly, when there is no electrical connection between contacts 1226, 1228, coil 122 is an open circuit and smartcard chip is 840 does not receive power and cannot communicate even when coil 122 is in the presence of an interrogating radio frequency field.

Second layer 1210 is above layer 1220. Second layer includes a connection mechanism (not shown in FIG. 12) that can conditionally electrically connect contacts 1226, 1228 in response to a user pressing or pinching secure transaction card 1200 in the vicinity of contacts 1226, 1228. An example connection mechanism is shown on layer 1230. Connection mechanism 1232 is in the form of a conductive strip bonded to layer 1230. In some embodiments, contacts similar to 1226, 1228 also exist on the bottom of layer 1220, and when secure transaction card 1200 is pressed or pinched in the vicinity of contacts 1226, 1228, coil 122 is closed and electrically connected to smartcard chip 1240.

In operation, smartcard chip 1240 and coil 122 do not always form a completed circuit. For example, in some embodiments, even though smartcard chip 1240 is always in contact with coil 122, coil 122 may include an open circuit when contacts 1226, 1228 are not electrically connected. When a user presses secure transaction card 1200 in the vicinity of contacts 1226, 1228, contact is made, and smartcard chip 1240 can receive power and communicate with a reader when in the presence of an interrogating radio frequency field. This keeps secure transaction card 1200 from responding to a reader unless a user presses on the card.

FIG. 13 shows a top view of the secure transaction card of FIG. 12. Area 1310 on the surface of secure transaction card 1200 marks the vicinity of contacts 1226, 1228. When a user presses on area 1310, contact is made between contacts 1226, 1228, and when in the presence of an interrogating radio frequency field, smartcard chip 1240 may receive power and respond to a reader. Area 1310 may be marked or indicated on the surface of secure transaction card 1200 in any manner. For example, in some embodiments, a recognizable icon is placed in area 1310, so that a user knows to press in that location. In other embodiments, text is placed in or near area 1310 to alert the user to press on area 1310 to effect a transaction.

In some embodiments, transaction card 1200 includes multiple locations at which a user can or must press in order to effect a transaction. For example, multiple locations may be indicated on one side of transaction card 1200, or multiple locations may be indicated on both sides of transaction card 1200.

FIG. 14 shows a sectional view of the secure transaction card of FIG. 12. The sectional view is in the vicinity of contacts 1226, 1228 (FIG. 12). A detail of view of that portion of the card is shown in FIG. 15.

FIG. 15 shows a detail view of a portion of the transaction card shown in FIG. 12. A cross section of smartcard chip coil 122 is shown in FIG. 15, as are layers 1210, 1220, 1230, contacts 1226, 1228, and conductive strip 1232. FIG. 15 also shows contacts 1236, 1238 and conductive strip 1212, which are not shown in FIG. 12. In embodiments represented by FIG. 15, coil 122 is embedded within layer 1220, and contacts 1226, 1228 are within a recessed portion of layer 1220. Conductive strip 1212 is bonded to the underside of layer 1210. Likewise, contacts 1236, 1238 are within a recessed portion of the underside of layer 1220, and conductive strip 1232 is bonded to the top of layer 1230. The bonding of conductive strips 1212, 1232 to layers 1210, 1230 and the size of the recessed portions housing contacts 1226, 1228, 1236, 1238 form a standoff mechanism that keeps coil 122 from forming a closed circuit with smartcard chip 1240 unless secure transaction card 1200 is pressed towards the first layer 1220 in the vicinity of area 1310. Circuit diagrams for various interconnection embodiments are described further below.

In operation, a closed circuit including coil 122 and smartcard chip 1240 is not formed unless secure transaction card 1200 is pressed in the vicinity of area 1310. Accordingly, even when in the presence of an interrogating radio frequency field, smartcard chip 1240 will not communicate with a reader without user intervention. This increases the security of secure transaction card 1200, in part because the smartcard chip cannot be interrogated without the user's consent.

Figure 16:
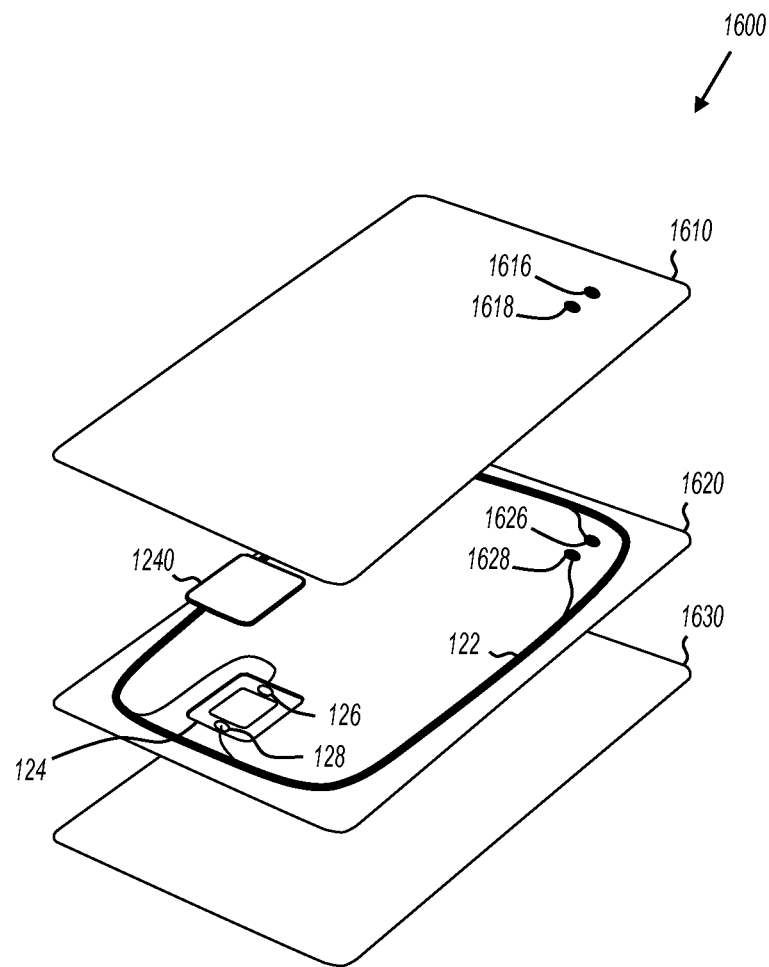
FIG. 16 shows an exploded view of a secure transaction card.

FIG. 16 shows an exploded view of a secure transaction card. Secure transaction card 1600 includes multiple layers 1610, 1620, 1630 that are laminated together, and also includes smartcard chip 1240. Three layers are shown in FIG. 12; however, any number of layers may be included without departing from the scope of the present invention. Further, the layers may be of any thickness and any relative thickness. For example, some layers may be thicker than others.

First layer 1620 of secure transaction card 1600 is similar, but not identical, to layer 1220 described above with reference to FIG. 12. Like layer 1220 of FIG. 12, layer 1620 includes an electrically conductive coil 122, a recessed portion 124, and coil contacts 126, 128. Layer 1220 also includes electrical contacts 1626 and 1628 coupled to coil 122.

In some embodiments, smartcard chip 1240 is electrically bonded to layer 1620 such that the antenna contacts on the underside of smartcard chip 1240 are electrically bonded to coil contacts 126 and 128.

In some embodiments, electrical contacts 1626, 1628 are in series with coil 122, such that when an electrical connection is made between contacts 1626, 1628, smartcard chip 1240 is connected to coil 122 and is able to receive power and communicate when coil 122 is in the presence of an interrogating radio frequency field. In other embodiments, electrical contacts 1626, 1628 are in parallel with coil 122 such that an electrical connection is made between contacts 1626, 1628, the antenna terminals of smartcard chip 1240 are effectively shorted, thereby disabling any contactless communications.

Second layer 1610 is above layer 1620. Second layer 1620 includes through vias 1616, 1618 that make connection to contacts 1626, 1628. In operation, smartcard chip 1240 and coil 122 do not always form a completed circuit. For example, in some embodiments, even though smartcard chip 1240 is always in contact with coil 122, coil 122 may include an open circuit when contacts 1626, 1628 are not electrically connected. In these embodiments, when a user touches vias 1616, 1618, contact is made, and smartcard chip 1240 can receive power and communicate with a reader when in the presence of an interrogating radio frequency field. Also for example, coil 122 may be detuned such that without a user touching vias 1616, 1618, coil 122 cannot generate sufficient voltage to power smartcard chip 1240. In these embodiments, when a user touches vias 1616, 1628, coil 122 becomes properly tuned, and contactless communications can take place.

FIG. 17 shows a top view of the secure transaction card of FIG. 16. In some embodiments, when a user touches vias 1616, 1618, contact is made between contacts 1626, 1628, and when in the presence of an interrogating radio frequency field, smartcard chip 1240 may receive power and respond to a reader. In other embodiments, a user touching vias 1616, 1618 either tunes or detunes coil 122 to either allow communications or disallow communications between smartcard chip 1240 and a reader device.

FIG. 18 shows a sectional view of the secure transaction card of FIG. 16. The sectional view of FIG. 18 shows the area of secure transaction card 1600 that includes contacts 1626, 1628, and vias 1616, 1618.

FIG. 19 shows a detail view of a portion of the transaction card shown in FIG. 16. The detail view shown in FIG. 19 includes layers 1610, 1620, 1630, contacts 1626, 1628, and vias 1616, 1618. As can be seen in FIG. 19, if a user touches vias 1616, 1618, then a connection through a user's skin is made between contacts 1626, 1628. Circuit diagrams for various interconnection embodiments are described further below.

Figure 20:
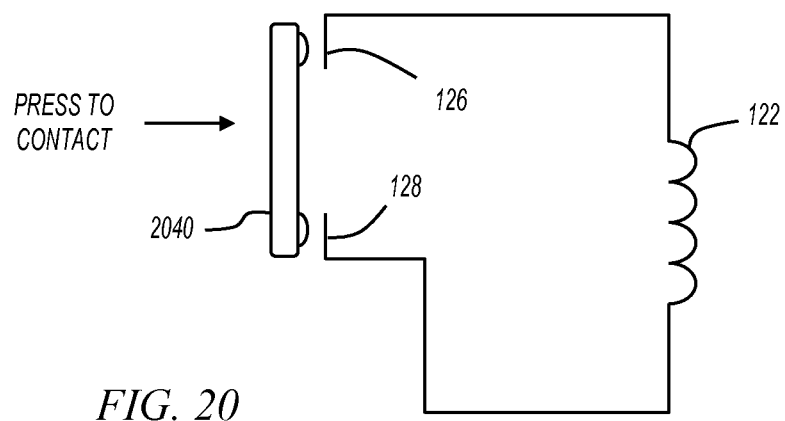
FIGS. 20-25 show diagrams of secure transaction cards with passive control.

FIGS. 20-25 show diagrams of secure transaction cards with passive control. FIG. 20 shows a circuit diagram that represents the electrical connections of secure transaction cards 100 (FIG. 1) and 800 (FIG. 8). Smartcard chip 2040 may be any of the smartcard chips described herein. As shown in FIG. 20, smartcard chip 2040 is not connected to coil 122 unless smartcard chip 2040 is pressed directly or unless the secure transaction card is pressed in the vicinity of smartcard chip 2040.

Figure 21:
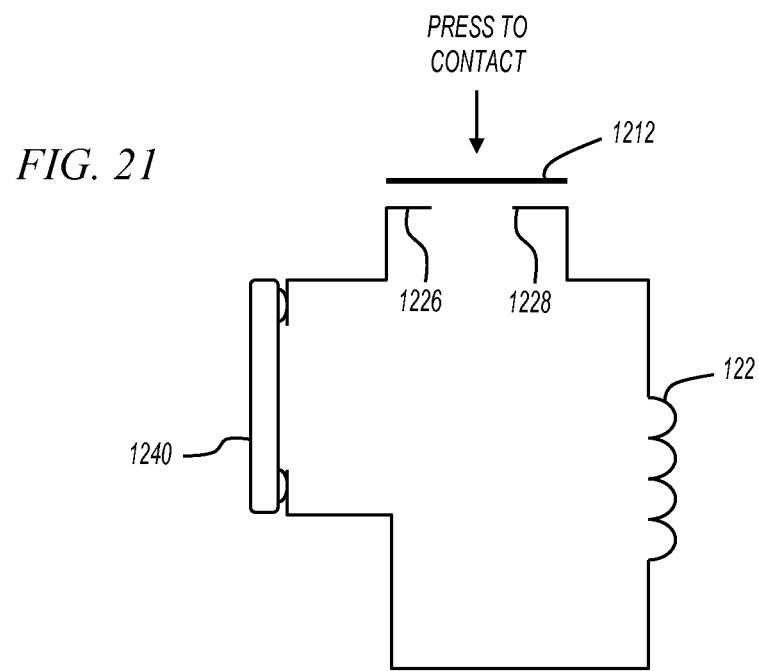

FIG. 21 shows a circuit diagram demonstrating the operation of at least one embodiment represented by secure transaction card 1200 (FIG. 12). In these embodiments, one set of contacts 1226, 1228 are in series with coil 122, and one conductive strip 1212 makes an electrical connection between contacts 1226 and 1228 when the secure transaction card is pressed in the vicinity of conductive strip 1212.

Figure 22:
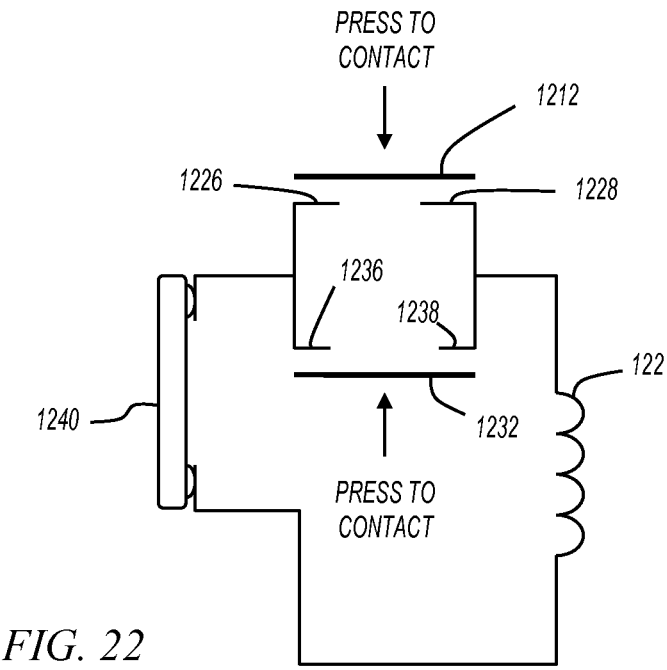

FIG. 22 shows a circuit diagram demonstrating the operation of at least one embodiment represented by secure transaction card 1200 (FIG. 12). In these embodiments, two set of contacts (1226, 1228) and (1236, 1238) are in series with coil 122, and are in parallel with each other. One conductive strip 1212 makes an electrical connection between contacts 1226 and 1228 when the secure transaction card is pressed in the vicinity of conductive strip 1212, and another conductive strip 1232 makes an electrical connection between contacts 1236, 1238 when the secure transaction card is pressed in the vicinity of conductive strip 1232. If either set of contacts are closed, then a connection is made between smartcard chip 1240 and coil 122.

In some embodiments, conductive strips 1212 and 1232 are on opposite sides of the secure transaction card as shown in FIGS. 12 and 15. In other embodiments, conductive strips and their associated contacts are on the same side of the secure transaction card. In still further embodiments, conductive strips and their associated contacts are on opposing sides of the card, but they are in different locations (e.g., on different corners of the card).

Figure 23:
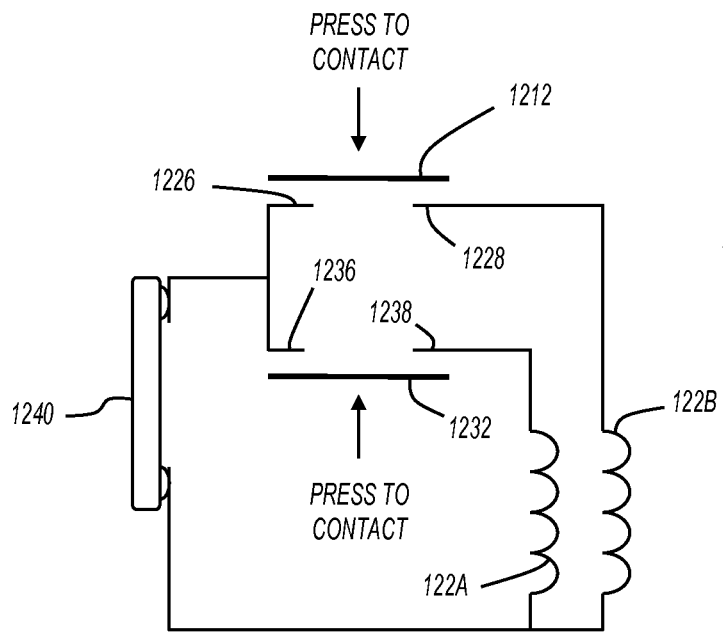

FIG. 23 is similar to FIG. 22 except that two separate coils exist. When contacts 1226, 1228 are electrically connected, smartcard chip 1240 is connected to coil 122B. When contacts 1236, 1238 are electrically connected, smartcard chip 1240 is connected to coil 122A. In some embodiments, the electrical specifications of coils 122A and 122B are sufficiently similar such that smartcard chip 1240 can operating regardless which one is used. This provides redundancy that may enhance reliability.

Figure 24:
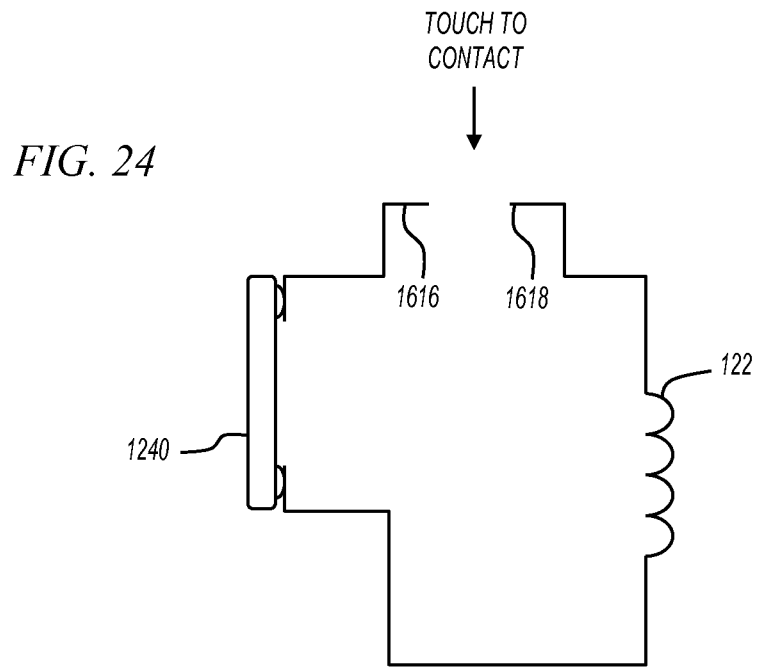

FIG. 24 shows a circuit diagram demonstrating the operation of at least one embodiment represented by secure transaction card 1600 (FIG. 16). In these embodiments, one set of contacts (vias 1616, 1228) are in series with coil 122. A user may make an electrical connection between the contacts when the secure transaction card is touched in the vicinity of vias 1616, 1618.

Figure 25:
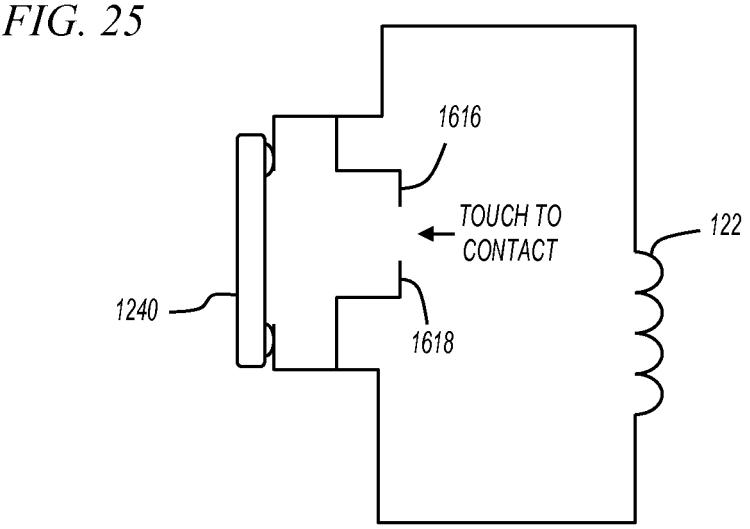

FIG. 25 shows a circuit diagram demonstrating the operation of at least one embodiment represented by secure transaction card 1600 (FIG. 16). In these embodiments, one set of contacts (vias 1616, 1228) are in parallel with coil 122. A user may make an electrical connection between the contacts when the secure transaction card is touched in the vicinity of vias 1616, 1618. By touching vias 1616, 1618, a user may modify the tuning of coil 122, thereby allowing or disallowing the operation of smartcard chip 1240.

Figure 26:
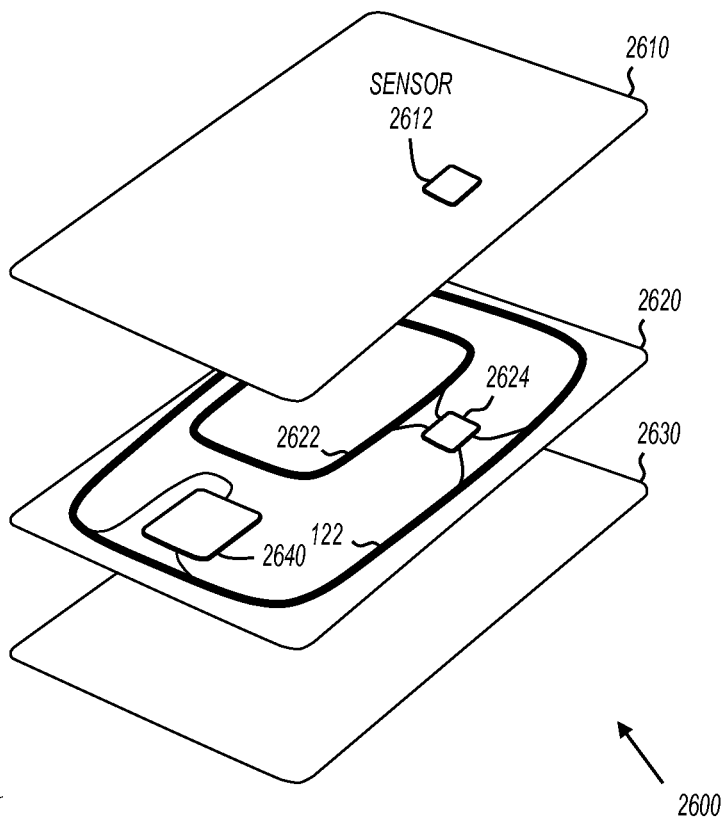
FIG. 26 shows an exploded view of a secure transaction card with active control.

FIG. 26 shows an exploded view of a secure transaction card with active control. Secure transaction card 2600 includes multiple layers 2610, 2620, 2630 that are laminated together, and also includes smartcard chip 2640. Three layers are shown in FIG. 26; however, any number of layers may be included without departing from the scope of the present invention. Further, the layers may be of any thickness and any relative thickness. For example, some layers may be thicker than others.

In the example provided in FIG. 26, smartcard chip 2640 does not include electrical contacts that will be exposed on a surface of the card. In some embodiments, smartcard chip 2640 is a contactless-only chip and does not include an ISO/IEC 7816 interface. In other embodiments, smartcard chip 2640 is a dual-interface smartcard chip that includes both ISO/IEC 7816 and ISO/IEC 14443 interfaces, and the ISO IEC 7816 interface is not exposed outside the transaction card.

First layer 2620 of secure transaction card 2600 is similar, but not identical, to layer 1220 described above with reference to FIG. 12. Like layer 1220 of FIG. 12, layer 2620 includes an electrically conductive coil 122. Layer 2620 also includes a second electrically conductive coil 2622, and control circuit 2624.

In some embodiments, smartcard chip 2640 is electrically bonded to layer 2620 such that the antenna contacts on the underside of smartcard chip 2640 are electrically bonded to coil contacts beneath the smartcard chip.

Second layer 2610 is above layer 2620. Second layer 2610 includes a sensor 2612 that is able to sense an environmental attribute, such as light, motion, sound, touch, proximity, a biometric, or the like. Sensor 2612 is coupled to control circuit 2624 such that control circuit can read the state of sensor 2612, and conditionally allow or disallow communications by smartcard chip 2640 based on the state of the environmental attribute. Layer 2630 is below layer 2620.

In operation, control circuit 2642 receives power from electrically conductive coil 2622 when in the presence of an interrogating radio frequency field. Control circuit 2622 can read the state of sensor 2612 and either allow contactless communications or disallow contactless communications. In some embodiments, control circuit 2642 allows contactless communications by conditionally coupling smartcard chip 2640 to coil 122 in response to an environmental attribute. In other embodiments, control circuit 2642 allows contactless communications by modifying a tuning element coupled to coil 122. In these embodiments, coil 122 is said to be "detuned" until control circuit 2624 "tunes" it. When coil 122 is detuned, smartcard chip is not able to draw power from coil 122. Various coil connection embodiments and tuning embodiments are described more fully below.

Figure 27:
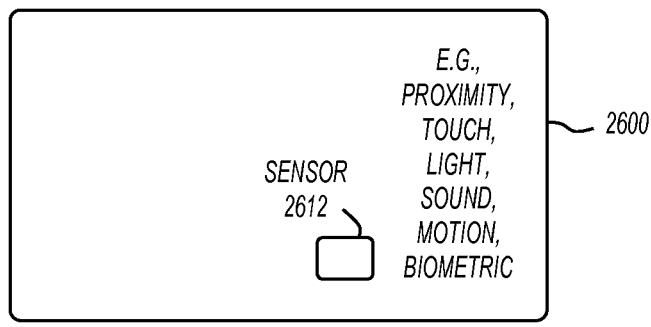
FIG. 27 shows a top view of the secure transaction card of FIG. 26.

FIG. 27 shows a top view of the secure transaction card of FIG. 26. Secure transaction card 2600 includes sensor 2612 exposed on a surface. In operation, a user may interact with secure transaction card 2600 by touching sensor 2612, exposing sensor 2612 to light, subjecting secure transaction card 2600 to motion, or the like. In some embodiments, secure transaction card 2600 may not perform a contactless transaction unless and until a user interacts with sensor 2612 in a prescribed fashion. This increases security because a reader cannot interact with a smartcard chip in secure transaction card 2600 without the user's consent.

Figure 28:
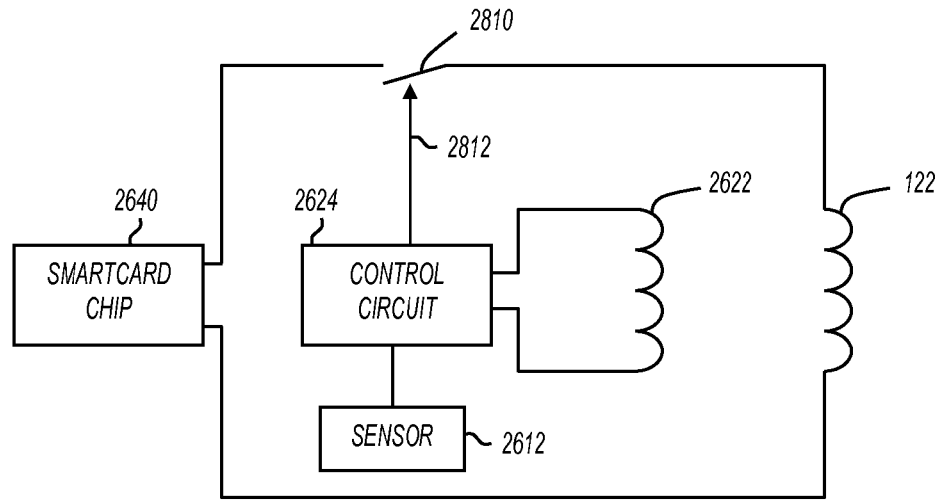
FIGS. 28 and 29 show diagrams of secure transaction cards with active control.
Figure 29:
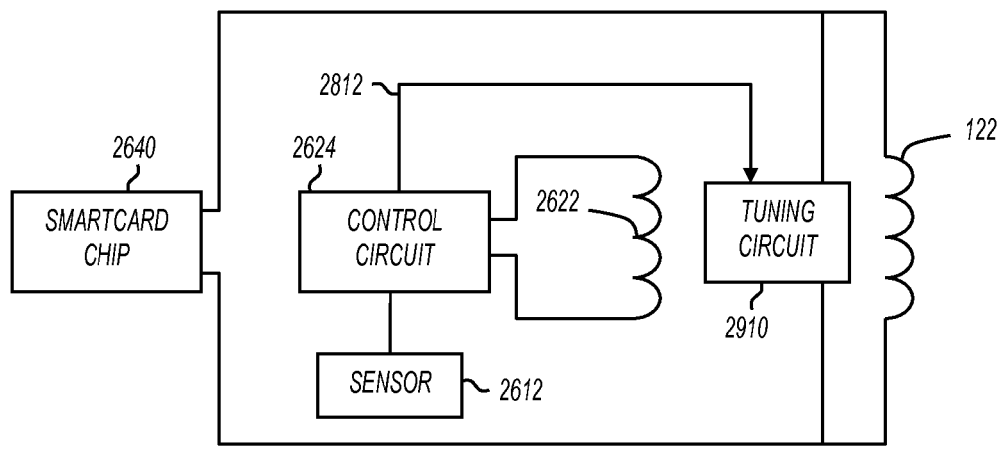

FIGS. 28 and 29 show diagrams of secure transaction cards with active control. FIG. 28 includes smartcard chip 2640, control circuit 2624, sensor 2612, and electrically conductive coils 2622, 122. Control circuit is coupled to receive power from electrically conductive coil 2622. When placed in the presence of an interrogating radio frequency field, control circuit 2642 draws power from coil 2622, and then makes a decision whether to couple smartcard chip 2640 to coil 122. If smartcard chip 2640 is coupled to coil 122, then contactless communications can take place to effect a transaction, and if smartcard 2640 is not coupled to coil 122, then contactless communication cannot take place and a transaction cannot be effected.

Control circuit 2624 may use any criteria, or environmental attribute, or sequence of sensor states in the decision whether to couple smartcard chip 2640 to coil 122 to effect a transaction. For example, in some embodiments, sensor 2612 is a light sensor. In these embodiments, control circuit 2624 may only effect a transaction when light above a certain threshold is sensed by sensor 2612. This may thwart attempts by a reader to interact with smartcard chip 2640 when smartcard chip 2640 is in a user's wallet or purse. In these embodiments, secure transaction card 2600 will only allow smartcard chip 2640 to interact with a reader when the card has been taken out from a user's wallet or purse and has been exposed to light. Further, in some embodiments, control circuit 2624 may only effect a transaction when a particular sequence of light states is detected. For example, a user may be required to block light from impinging on the sensor when first placing the secure transaction card in the interrogating radio frequency field, followed by allowing light to impinge on the sensor.

Also for example, in some embodiments, sensor 2612 senses human touch. In these embodiments, control circuit 2642 may only effect a transaction when a user touches the sensor. This may also thwart nefarious reader attempts at communications. In still further examples, sensor 2612 may be a motion sensor and a transaction may not be effected unless the card undergoes a certain motion, sensor 2612 may be a biometric sensor and a transaction may not be effected unless a particular biometric (e.g., finger print) is sensed, or sensor 2612 may be a microphone and a transaction may not be effected unless the card receives a particular audio sequence (e.g., voice commands or user voice recognition). Sensor 2612 may sense any environmental attribute and control circuit 2642 may allow or disallow contactless communications based on any state of any environmental attribute or sequence of environmental attributes without departing from the scope of the present invention.

FIG. 28 shows control circuit 2624 controlling a switch 2810 with a control signal 2812 to conditionally couple smartcard chip 2640 to coil 122. In some embodiments, switch 2810 may be a metal oxide semiconductor transistor that is connected as a pass transistor. In these embodiments, control signal 2812 may be coupled to a gate node of the transistor to turn the transistor on and off under the direction of control circuit 2624. Switch 2810 may be implemented in any manner using any suitable components without departing from the scope of the present invention.

FIG. 29 includes many of the same elements as FIG. 28, however, rather than switch 2810, FIG. 29 includes tuning circuit 2910. Embodiments represented by FIG. 29 tune or detune coil 122 to allow or disallow contactless communications. For example in some embodiments, tuning circuit 2910 includes additional capacitance and/or inductance, which when in parallel with coil 122, detunes coil 122 to the point that smartcard chip 2640 cannot draw sufficient power from coil 122 to operate. If control circuit 2624 determines that a transaction should be effected, then through the operation of control signal 2812, control circuit 2624 may tune coil 122 by removing the excess capacitance and/or inductance present in tuning circuit 2910. When coil 122 is tuned, it is resonant at the frequency of the interrogating radio frequency field and smartcard chip 2640 may draw sufficient power from coil 122 to operate.

Figure 30:
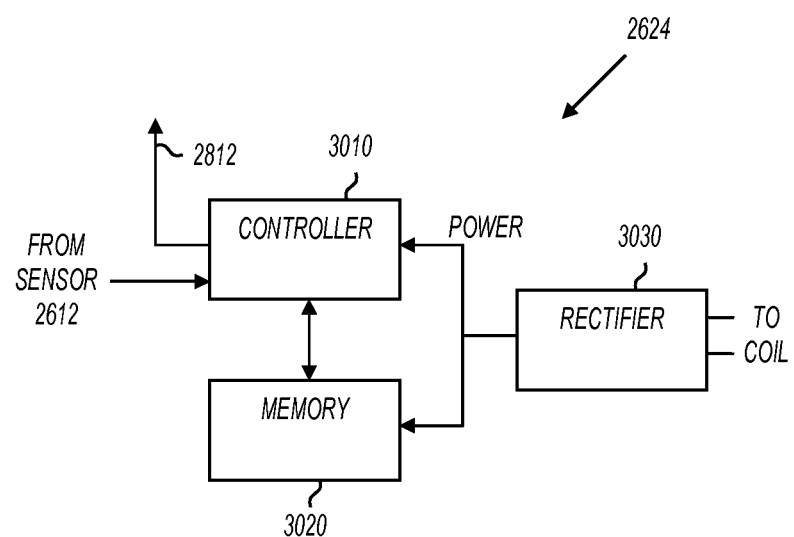
FIG. 30 shows a diagram of a control circuit used in a secure transaction card.

FIG. 30 shows a diagram of a control circuit used in a secure transaction card. Control circuit 2624 includes controller 3010, memory 3020, and rectifier 3030. Control circuit 2624 may include many more elements without departing from the scope of the present invention.

Controller 3010 may be any type of controller or processor capable of executing instructions stored in memory 3020 and capable of interfacing with the various components shown in FIG. 30. For example, controller 3010 may be a microprocessor, a digital signal processor, an application specific processor, or the like. In some embodiments, controller 3010 is a component within a larger integrated circuit such as a system on chip (SOC) application specific integrated circuit (ASIC).

Memory 3020 may include any type of memory device. For example, memory 3020 may include volatile memory such as static random access memory (SRAM), or nonvolatile memory such as FLASH memory. Memory 3020 is encoded with (or has stored therein) one or more software modules (or sets of instructions), that when accessed by controller 3010, result in controller 3010 performing various functions.

Rectifier 3030 is coupled to a coil to receive power when the coil is in the presence of an interrogating radio frequency field. For example, in some embodiments, rectifier 3030 is coupled to coil 2622 (FIGS. 26, 28, 29). In these embodiments, when the secure transaction card is in the presence of an interrogating radio frequency field, rectifier 3030 rectifies a voltage on coil 2622, and provides power to the remainder of control circuit 2642.

In operation, control circuit 2642 starts to function when the secure transaction card is in the presence of an interrogating radio frequency field and power is supplied to controller 3010. Controller 3010 reads instructions encoded in memory 3020, and performs actions in response thereto. In some embodiments, the actions include reading the state of sensor 2612 and driving control signals on node 2812 to either allow or disallow a contactless transaction.

Figure 31:
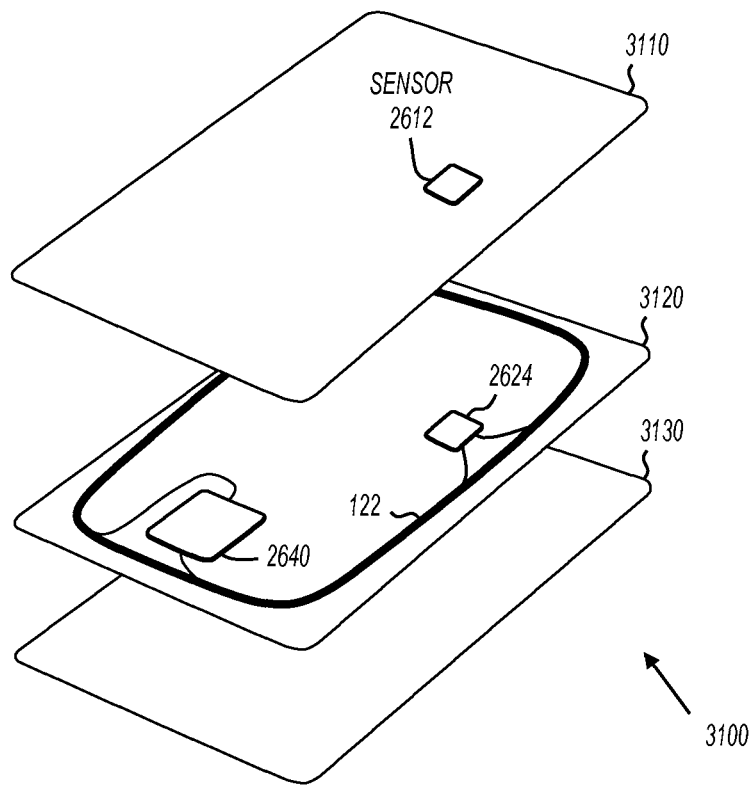
FIG. 31 shows an exploded view of a secure transaction card with active control.

FIG. 31 shows an exploded view of a secure transaction card with active control. Secure transaction card 3100 is similar to transaction card 2600 (FIG. 26) with the exception that transaction card 3100 omits coil 2622. Secure transaction card 3100 includes first layer 3120 that includes electrically conductive coil 122, smartcard chip 2640, and control circuit 2642. Layer 3110 is above layer 3120 and includes sensor 2612. Layer 3130 is below layer 3120.

In operation, control circuit 2642 draws power from coil 122 when in the presence of an interrogating radio frequency field, and then determines whether to couple smartcard chip 2640 to coil 122 to effect a transaction. This is explained more fully below with reference to FIG. 32.

Figure 32:
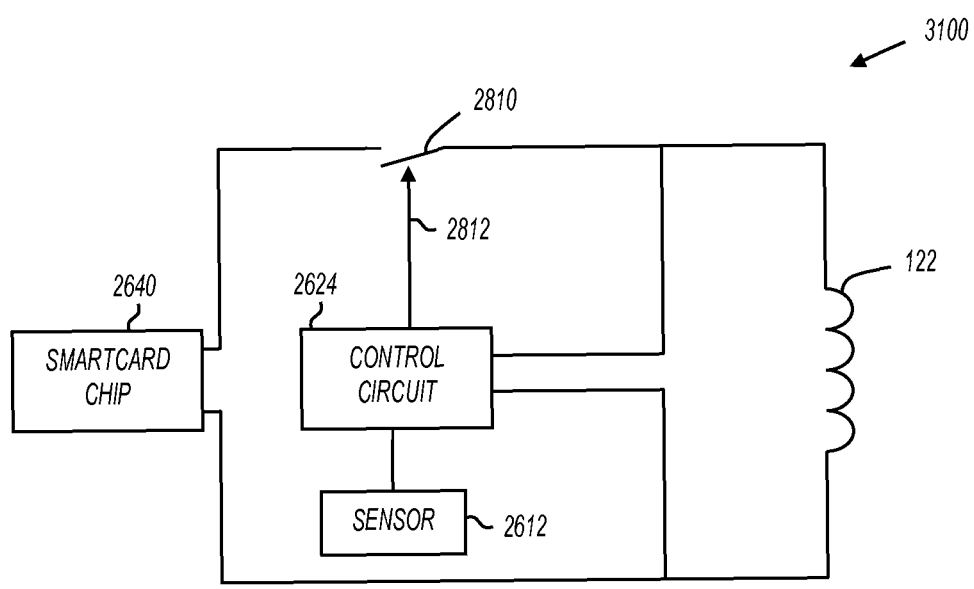
FIG. 32 shows a diagram of a secure transaction card with active control.

FIG. 32 shows a diagram of a secure transaction card with active control. FIG. 32 shows that secure transaction card 3100 has control circuit 2624 coupled to coil 122. When control circuit 2624 determines that contactless communications should be allowed and a transaction should be effected, switch 2810 is closed using control signal 2812 as described above with reference to FIG. 28.

Figure 33:
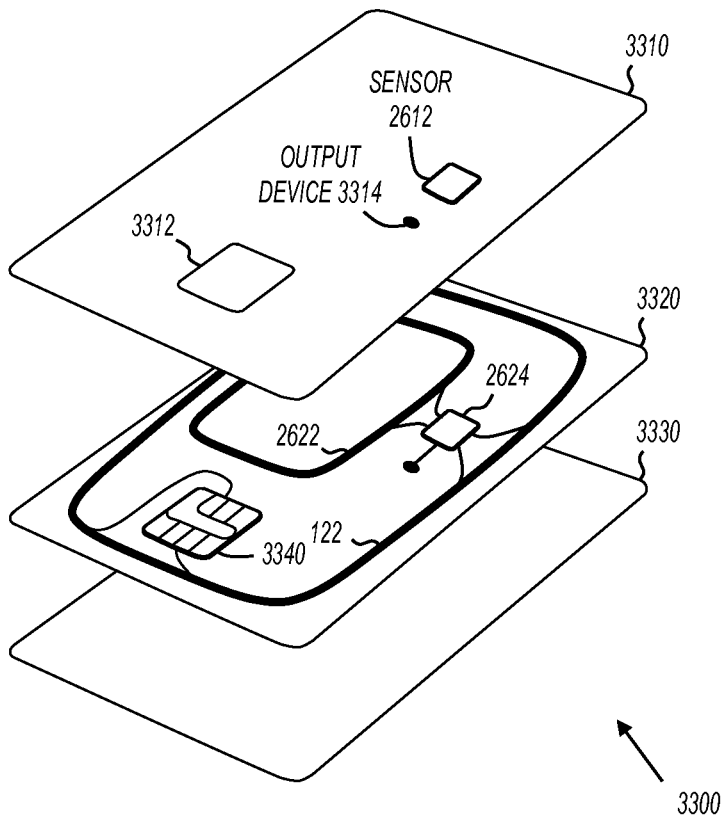
FIG. 33 shows an exploded view of a secure transaction card with active control.

FIG. 33 shows an exploded view of a secure transaction card with active control. Secure transaction card 3300 includes layers 3310, 3320, and 3330. First layer 3320 includes electrically conductive coils 122 and 2622, control circuit 2624, and smartcard chip 3340. In embodiments represented by FIG. 33, control circuit 2624 receives power from coil 2622 when in the presence of an interrogating radio frequency field, and then determines whether to conditionally couple smartcard chip 3340 to coil 122, where the condition includes a state or sequence of states read from sensor 2612.

Layer 3310 is above layer 3320 and includes hole 3312 to allow electrical contacts on smartcard chip 3300 to be exposed on the surface of the card. Smartcard chip 3340 is an example of a dual interface smartcard chip that can communicate using a contact interface as well as a contactless interface. Layer 3310 also includes output device 3314. In some embodiments, output device 3314 emits light, and in other embodiments, output device 3314 emits sound. For example, output device 3314 may be a light emitting diode or a speaker. Output device 3314 is shown coupled to control circuit 2624.

Figure 34:
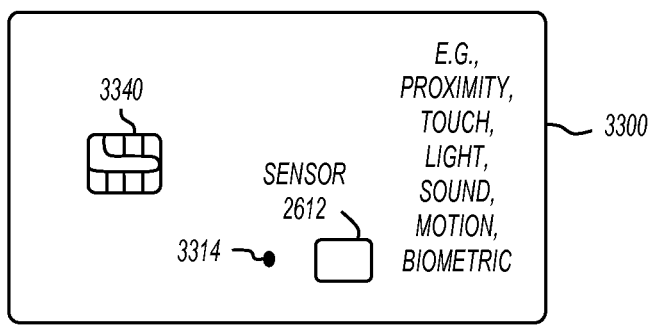
FIG. 34 shows a top view of the secure transaction card of FIG. 32.

FIG. 34 shows a top view of the secure transaction card of FIG. 33. Electrical contacts on smartcard chip 3340 are exposed on the top surface of secure transaction card 330. Similarly, sensor 2612 may be exposed on a surface of the card, as may be output device 3314.

Figure 35:
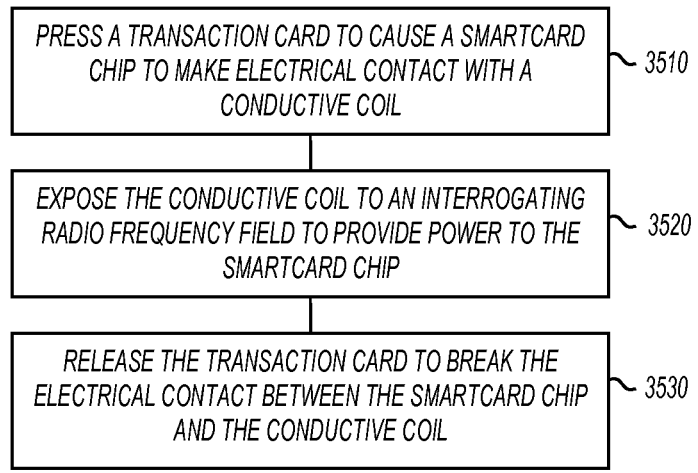
FIGS. 35 and 36 show flowcharts of methods in accordance with various embodiments of the present invention.

FIG. 35 shows a flowchart of methods in accordance with various embodiments of the present invention. In some embodiments, method 3500 is performed by a user when interacting with a secure transaction card in accordance with various embodiments of the present invention. The various actions in method 3500 may be performed in the order presented, in a different order, or simultaneously. Further, in some embodiments, some actions listed in FIG. 35 are omitted from method 3500.

Method 3500 begins at 3510 in which a transaction card is pressed to cause a smartcard chip to make electrical contact with a conductive coil. In some embodiments, this corresponds to a user press directly on a smartcard chip such as smartcard chip 140 (FIGS. 1, 4) or in the vicinity of a smartcard chip such as near area 812 (FIG. 9). In other embodiments, this corresponds to a user pressing in an area (e.g., area 1310; FIG. 13) that will cause a conductive strip to make a connection to contacts coupled to an electrically conductive coil.

At 3520, the conductive coil is exposed to an interrogating radio frequency field to provide power to the smartcard chip. In some embodiments, this corresponds to exposing electrically conductive coil 122 to an interrogating radio frequency field generated by a reader device such as a point of sale device.

At 3530, the transaction card is released to break the electrical contact between the smartcard chip and the electrically conductive coil. When the contact is broken, the smartcard chip is no longer able to respond to the interrogating radio frequency field.

Figure 36:
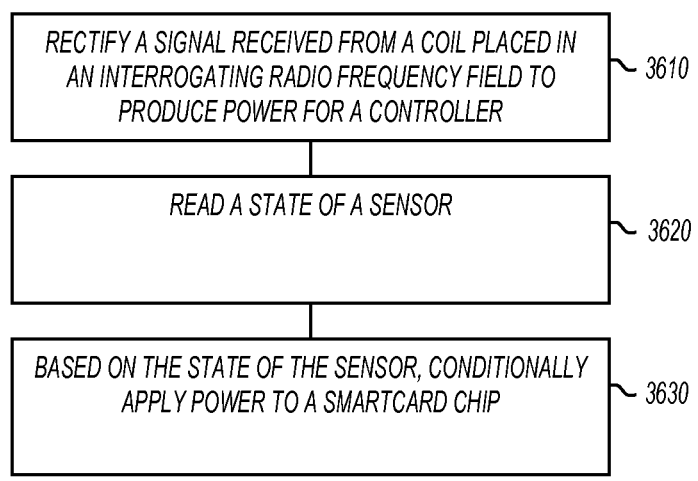

FIG. 36 shows a flowchart of methods in accordance with various embodiments of the present invention. In some embodiments, method 3600 may be performed by a secure transaction card such any of those shown in previous figures. Further, in some embodiments, method 3600 may be performed by a control circuit such as control circuit 2642 (FIG. 26). Method 3600 is not limited by the type of system or entity that performs the method. The various actions in method 3600 may be performed in the order presented, in a different order, or simultaneously. Further, in some embodiments, some actions listed in FIG. 36 are omitted from method 3600.

Method 3600 begins at 3610 in which a signal received from a coil placed in an interrogating radio frequency field is rectified to produce power from a controller. This corresponds to rectifier 3030 (FIG. 30) rectifying a signal received from either coil 122 (FIG. 32) or 2622 (FIG. 28).

At 3620, a sensor state is read. This corresponds to controller 3010 (FIG. 30) reading the state of sensor 2612 (FIG. 26). In some embodiments, the sensor state is read multiple times, and a sequence is detected.

At 3630, power is conditionally applied to a smartcard chip based on the state of the sensor, or based on a sequence of states read from the sensor. For example, in some embodiments, controller 3010 connects a smartcard chip to a coil as in FIG. 28. Also for example, in some embodiments, controller 3010 tunes a coil to which the smartcard chip is already connected as in FIG. 29.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A transaction card comprising:
a smartcard chip having two antenna contacts;
a first layer having an electrically conductive coil, the first layer including two coil contacts electrically connected to the electrically conductive coil;
a standoff mechanism to keep the two antenna contacts on the smartcard chip from contacting the two coil contacts unless the smartcard chip is pressed towards the first layer;
a sensor to sense an environmental attribute;
a controller coupled to conditionally allow or disallow communications by the smartcard chip based on the environmental attribute; and
a second electrically conductive coil, wherein the controller is coupled to receive power from the second electrically conductive coil when the second electrically coupled coil is placed in an interrogating radio frequency field.

2. The transaction card of claim 1 wherein the first layer is plastic, and the standoff mechanism is molded into the plastic of the first layer.

3. The transaction card of claim 2 wherein the standoff mechanism is a cantilevered portion of the first layer extending beneath the smartcard chip.

4. The transaction card of claim 1 wherein the standoff mechanism comprises a spring between the first layer and the smartcard chip.

5. The transaction card of claim 1 further comprising a second layer above the first layer.

6. The transaction card of claim 5 wherein the second layer has a hole to expose the smartcard chip.

7. The transaction card of claim 6 wherein the smartcard chip includes electrical contacts that are exposed through the hole.

8. The transaction card of claim 1 wherein the environmental attribute comprises light.

9. The transaction card of claim 1 wherein the environmental attribute comprises motion.

10. The transaction card of claim 1 wherein the environmental attribute comprises sound.

11. The transaction card of claim 1 wherein the environmental attribute comprises proximity.

12. The transaction card of claim 1 wherein the environmental attribute comprises a biometric.

13. The transaction card of claim 1 wherein the environmental attribute comprises touch.

14. A transaction card comprising:
a first layer having an electrically conductive coil, the first layer including two coil contacts electrically connected to the electrically conductive coil;
a second layer positioned above the first layer;
a smartcard chip attached to the second layer and suspended above the two coil contacts of the first layer, the smartcard chip having two antenna contacts that make contact with the two coil contacts only when the transaction card is pressed in the vicinity of the smartcard chip;
a sensor to sense an environmental attribute;
a controller coupled to conditionally allow or disallow communications by the smartcard chip based on the environmental attribute; and
a second electrically conductive coil, wherein the controller is coupled to receive power from the second electrically conductive coil when the second electrically coupled coil is placed in an interrogating radio frequency field.

15. The transaction card of claim 14 wherein the first layer has a recessed portion above which the smartcard chip is suspended.

16. The transaction card of claim 14 further comprising a spring to suspend the smartcard chip above the two coil contacts.

17. The transaction card of claim 14 wherein the second layer has a hole to expose the smartcard chip.

18. The transaction card of claim 17 wherein the smartcard chip includes exposed electrical contacts.

19. The transaction card of claim 14 wherein the smartcard chip receives power from the coil when in the presence of an interrogating radio frequency field and the two coil contacts are contacting the two antenna contacts.

* * * * *